Patented Oct. 24, 1950

2,526,807

UNITED STATES PATENT OFFICE 2,526,807

PROCESS FOR SEPARATING 1,3,4-XYLENOL AND 1,4,2-XYLENOL FROM MIXTURES CONTAINING THE SAME AND ORGANIC BASE COMPLEXES DERIVED THEREFROM

Francis E. Cislak and Merritt M. Otto, Indianapolis, Ind.

No Drawing. Application August 20, 1945, Serial No. 611,696

20 Claims. (Cl. 260—286)

Our invention relates to the separation of 1,3,4-xylenol (1,3-dimethyl-4-hydroxybenzene) from mixtures containing 1,3,4-xylenol and 1,4,2-xylenol (1,4-dimethyl-2-hydroxybenzene) with the 1,3,4-xylenol predominating.

It is the object of our present invention to obtain the individual 1,3,4-xylenol; and to obtain new compounds of 1,3,4-xylenol and an organic base.

A mixture of 1,3,4-xylenol and 1,4,2-xylenol, associated with various other phenolic bodies, is obtained in the processing of coal tar and of petroleum. The other phenolic bodies commonly present, including paraethylphenol, can be separated quite readily and fairly completely from the mixture of 1,3,4-xylenol and 1,4,2-xylenol by fractional distillation. But the boiling points of the 1,3,4-xylenol and the 1,4,2-xylenol are so close together that it is not commercially practical to separate them by fractional distillation.

We have found that by treating with an organic base of the class of 2-methylquinoline, 4-methylquinoline, 8-methylquinoline, aniline, 3-methylaniline, 4-methylaniline, and 2,6-dimethylpiperidine a mixture of 1,3,4-xylenol and 1,4,2-xylenol containing more than about 55% or more than about 65% 1,3,4-xylenol, whether or not the mixture also contains small amounts of higher and/or lower related phenolic bodies (such as the cresols and paraethylphenol), and cooling, either before and/or after and/or during the mixing, we get a formation of crystals of an addition product of some character composed of one molecule of 1,3,4-xylenol and one molecule of 2-methylquinoline or 4-methylquinoline or 8-methylquinoline or aniline or 3-methylaniline or 4-methylaniline or 2,6-dimethylpiperidine, as the case may be. For convenience we shall refer to these addition products as 1,3,4-xylenolorganic base. When treating with 8-methylquinoline or with aniline or with 4-methylaniline or with 2,6-dimethylpiperidine the cooling is desirably to a temperature at least as low as about −5° C. but rarely needs to be below −15° C.; when treating with 2-methylquinoline or with 4-methylquinoline or with 3-methylaniline the cooling is desirably to a temperature as low as about 10° C. but rarely needs to be below about −10° C. The crystals in any of these cases can readily be recovered, as by decanting or filtering; and can readily be reconverted into substantially pure 1,3,4-xylenol, and substantially pure organic bases (2-methylquinoline or 4-methylquinoline or 8-methylquinoline or aniline or 3-methylaniline or 4-methylaniline or 2,6-dimethylpiperidine).

Upon the recovery of the crystals of 1,3,4-xylenolorganic base by the decanting or filtering above referred to, the mother liquor remaining is much enriched in 1,4,2-xylenol, in comparison with the original 1,3,4-xylenol-1,4,2-xylenol mixture; and also contains considerable organic base and some 1,3,4-xylenol. This mother liquor may be used as a source of 1,4,2-xylenol.

The 1,3,4-xylenol-2-methylquinoline, 1,3,4-xylenol-4-methylquinoline, 1,3,4-xylenol-8-methylquinoline, 1,3,4-xylenol-aniline, 1,3,4-xylenol-3-methylaniline, 1,3,4-xylenol-4-methylaniline, and 1,3,4-xylenol-2,6-dimethylpiperidine, are new compounds. The approximate crystal points of these new products are tabulated below:

|  | °C. |
|---|---|
| 1,3,4-xylenol-2-methylquinoline | 29 |
| 1,3,4-xylenol-4-methylquinoline | 41 |
| 1,3,4-xylenol-8-methylquinoline | 15 |
| 1,3,4-xylenol-aniline | 19 |
| 1,3,4-xylenol-3-methylaniline | 29 |
| 1,3,4-xylenol-4-methylaniline | 21 |
| 1,3,4-xylenol-2,6-dimethylpiperidine | 14 |

These new compounds are of interest in the preparation of disinfectants and insecticides as well as in the present process of separating 1,3,4-xylenol from 1,4,2-xylenol.

The following examples illustrate our invention.

*Example 1.*—100 pounds of a mixture of 1,3,4-xylenol and 1,4,2-xylenol, containing more than about 55% 1,3,4-xylenol, is thoroughly mixed with about 130 pounds of 2-methylquinoline and about 20 pounds of petroleum naphtha. The mixing can be done with the ingredients cold, or preferably the mixture may be cooled after the mixing, in either case to obtain a temperature of about −10° C. to 10° C. By such cooling the addition product 1,3,4-xylenol-2-methylquinoline, usually crystallizes spontaneously from the mixture, although sometimes it is necessary to start crystallization by seeding with crystals of 1,3,4-xylenol-2-methylquinoline. The crystals of 1,3,4-xylenol-2-methylquinoline produced by the cooling are suitably separated, most conveniently by filtration. Although it is not necessary to do so, we prefer to wash these crystals with a cooled inert solvent—such as a paraffinic petroleum naphtha—to remove any mother liquor adhering to the crystals. These crystals of 1,3,4-xylenol-2-methylquinoline are subjected to fractional distillation, which decomposes them into 1,3,4-xylenol and 2-methylquinoline, whereupon the 1,3,4-xylenol distills over first and then the 2-methylquinoline distills over. As, so recovered the 1,3,4-xylenol is usually of about 90% to 95% purity.

In place of the 2-methylquinoline, we can use 4-methylquinoline or 8-methylquinoline.

*Example 2.*—100 pounds of a mixture of 1,3,4-xylenol and 1,4,2-xylenol, containing more than about 65% 1,3,4-xylenol, is thoroughly mixed with about 100 pounds of aniline, and with about 15 pounds of petroleum naphtha. The mixing can be done with the ingredients cold, or preferably the mixture may be cooled after the mixing, in either case to get a temperature of about −5° C. to −15° C. By such cooling the addition product, 1,3,4-xylenol-aniline, usually crystallizes spontaneously from the mixture, although sometimes it is necessary to start crystallization by seeding with crystals of 1,3,4-xylenol-aniline. The crystals of 1,3,4-xylenol-aniline produced by the cooling are suitably separated, most conveniently by filtration. Although it is not necessary to do so, we prefer to wash these crystals with a cooled inert solvent—such as a paraffinic petroleum naphtha—to remove any mother liquor adhering to the crystals. These crystals of 1,3,4-xylenol-aniline are mixed with about 175 pounds of 10% aqueous caustic soda solution. This mixing with caustic soda solution decomposes the crystals of 1,3,4-xylenol-aniline into the sodium salt of 1,3,4-xylenol and aniline. The aniline is recovered from this caustic soda solution by steam distillation; when all the aniline has been steam distilled from the solution, the sodium salt of 1,3,4-xylenol is decomposed by acidifying the caustic soda solution, as with sulfuric acid, whereupon the 1,3,4-xylenol forms an upper layer and is separated from the lower aqueous salt layer as by decantation. The 1,3,4-xylenol, after drying, is usually of about 90% to 95% purity.

In place of the aniline, we can use 3-methylaniline, or 4-methylaniline, or 2,6-dimethylpiperidine.

In the above examples, we have used a molecular excess of organic base; this we deem desirable although not essential.

We claim:

1. The process of separating 1,3,4-xylenol from a mixture consisting mainly of 1,3,4-xylenol and 1,4,2-xylenol, with the 1,3,4-xylenol content being more than about 55% to 65%, which consists in mixing such a mixture with an organic base of the class consisting of 2-methylquinoline, 4-methylquinoline, 8-methylquinoline, aniline, 3-methylaniline, 4-methylaniline, and 2,6-dimethylpiperidine, and producing in the resulting mixture a sufficiently low temperature to form crystals of 1,3,4-xylenol-organic base, separating such crystals, and decomposing the crystals to recover 1,3,4-xylenol in purified form.

2. The process of separating 1,3,4-xylenol from a mixture consisting mainly of 1,3,4-xylenol and 1,4,2-xylenol, with the 1,3,4-xylenol content being more than about 55% to 65%, which consists in mixing such a mixture with a molecular excess of an organic base of the class consisting of 2-methylquinoline, 4 - methylquinoline, 8 - methylquinoline, aniline, 3-methylaniline, 4-methylaniline, and 2,6-dimethylpiperidine, and producing in the resulting mixture a sufficiently low temperature to form crystals of 1,3,4-xylenol-organic base, separating such crystals, and decomposing the crystals to recover 1,3,4-xylenol in purified form.

3. The process of separating 1,3,4-xylenol as set forth in claim 1, in which the organic base is 2-methylquinoline.

4. The process of separating 1,3,4-xylenol as set forth in claim 1, in which the organic base is 4-methylquinoline.

5. The process of separating 1,3,4-xylenol as set forth in claim 1, in which the organic base is aniline and the 1,3,4-xylenol content is more than about 65%.

6. The process of separating 1,3,4-xylenol as set forth in claim 2, in which the organic base is 2-methylquinoline.

7. The process of separating 1,3,4-xylenol as set forth in claim 2, in which the organic base is 4-methylquinoline.

8. The process of separating 1,3,4-xylenol as set forth in claim 2, in which the organic base is aniline and the 1,3,4-xylenol content is more than about 65%.

9. The process of producing a compound of 1,3,4-xylenol and an organic base of the class consisting of 2-methylquinoline, 4-methylquinoline, 8-methylquinoline, aniline, 3-methylaniline, 4-methylaniline, and 2,6-dimethylpiperidine, which consists in mixing the organic base and a mixture consisting mainly of 1,3,4-xylenol and 1,4,2-xylenol, with the 1,3,4-xylenol content being more than about 55% to 65%, and producing in the resulting mixture a sufficiently low temperature to form crystals of 1,3,4-xylenol-organic base.

10. The process of producing a compound of 1,3,4-xylenol and an organic base of the class consisting of 2-methylquinoline, 4-methylquinoline, 8-methylquinoline, aniline, 3-methylaniline, 4-methylaniline, and 2,6-dimethylpiperidine, which consists in mixing a molecular excess of the organic base and a mixture consisting mainly of 1,3,4-xylenol and 1,4,2-xylenol, with the 1,3,4-xylenol content being more than about 55% to 65%, and producing in the resulting mixture a sufficiently low temperature to form crystals of 1,3,4-xylenol-organic base.

11. The process of producing 1,3,4-xylenol-2-methylquinoline which consists in mixing 2-methylquinoline and a mixture consisting mainly of 1,3,4-xylenol and 1,4,2-xylenol, with the 1,3,4-xylenol content being more than about 55%, and producing in the resulting mixture a low temperature and crystallizing 1,3,4-xylenol-2-methylquinoline from the resulting mixture.

12. The process of producing 1,3,4-xylenol-4-methylquinoline which consists in mixing 4-methylquinoline and a mixture consisting mainly of 1,3,4-xylenol and 1,4,2-xylenol, with the 1,3,4-xylenol content being more than about 55%, and crystallizing 1,3,4 - xylenol - 4 - methylquinoline from the resulting mixture.

13. The process of producing 1,3,4-xylenol-aniline which consists in mixing aniline and a mixture consisting mainly of 1,3,4-xylenol and 1,4,2-xylenol, with the 1,3,4-xylenol content being more than about 65%, and crystallizing 1,3,4-xylenol-aniline from the resulting mixture.

14. The new compounds of 1,3,4-xylenol and an organic base of the class consisting of 2-methylquinoline, 4-methylquinoline, 8-methylquinoline, aniline, 3-methylaniline, 4-methylaniline, and 2,6-dimethylpiperidine.

15. The new compound 1,3,4-xylenol-2-methylquinoline.

16. The new compound 1,3,4-xylenol-aniline.

17. The new compound 1,3,4-xylenol-2,6-dimethylpiperidine.

18. The process of separating 1,3,4-xylenol from a mixture consisting mainly of 1,3,4-xylenol and 1,4,2-xylenol, with the 1,3,4-xylenol content being more than about 55% to 65%, which consists in mixing such a mixture with 2-methylquinoline, and crystallizing 1,3,4-xylenol-organic base from the resulting mixture, separating the crystals so produced, and decomposing the crystals to recover 1,3,4-xylenol in purified form.

19. The process of separating 1,3,4-xylenol from a mixture consisting mainly of 1,3,4-xylenol and 1,4,2-xylenol, with the 1,3,4-xylenol content being more than about 55% to 65%, which consists in mixing such a mixture with 4-methylquinoline, and crystallizing 1,3,4-xylenol-organic base from the resulting mixture, separating the crystals so produced, and decomposing the crystals to recover 1,3,4-xylenol in purified form.

20. The process of separating 1,3,4-xylenol from a mixture consisting mainly of 1,3,4-xylenol and 1,4,2-xylenol, with the 1,3,4-xylenol content being more than about 65%, which consists in mixing such a mixture with aniline, and crystallizing 1,3,4-xylenol-organic base from the resulting mixture, separating the crystals so produced, and decomposing the crystals to recover 1,3,4-xylenol in purified form.

FRANCIS E. CISLAK.
MERRITT M. OTTO.

REFERENCES CITED

The following references are of record in the file of this patent:

UNITED STATES PATENTS

| Number | Name | Date |
| --- | --- | --- |
| 1,795,382 | Ulrich | Mar. 10, 1931 |
| 1,830,859 | Schotte et al. | Nov. 10, 1931 |
| 1,942,838 | Semon | Jan. 9, 1934 |
| 1,980,901 | Bentley et al. | Nov. 13, 1934 |
| 2,029,642 | Semon | Feb. 4, 1936 |
| 2,193,336 | Lecher et al. | Mar. 12, 1940 |
| 2,321,036 | Luten et al. | June 8, 1943 |

OTHER REFERENCES

Fieser and Fieser, "Organic Chemistry" (Heath and Co., Boston, 1944), page 529. (Copy in Patent Office Library.)